May 12, 1925. 1,537,233
R. B. HARTMAN
BRAKE BAND AND LINING
Original Filed Feb. 2, 1920 2 Sheets-Sheet 2
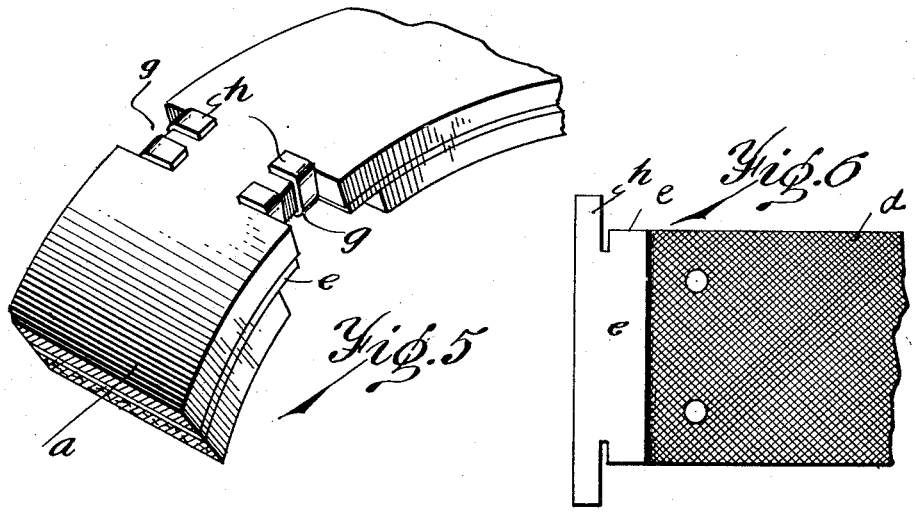
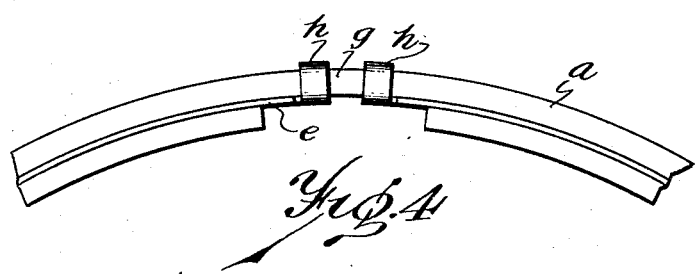
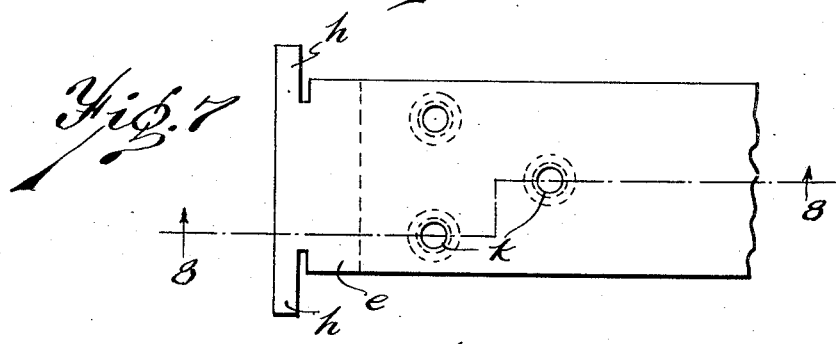
Inventor
Richard B. Hartman
By Stuart S. Barnes
Attorney.

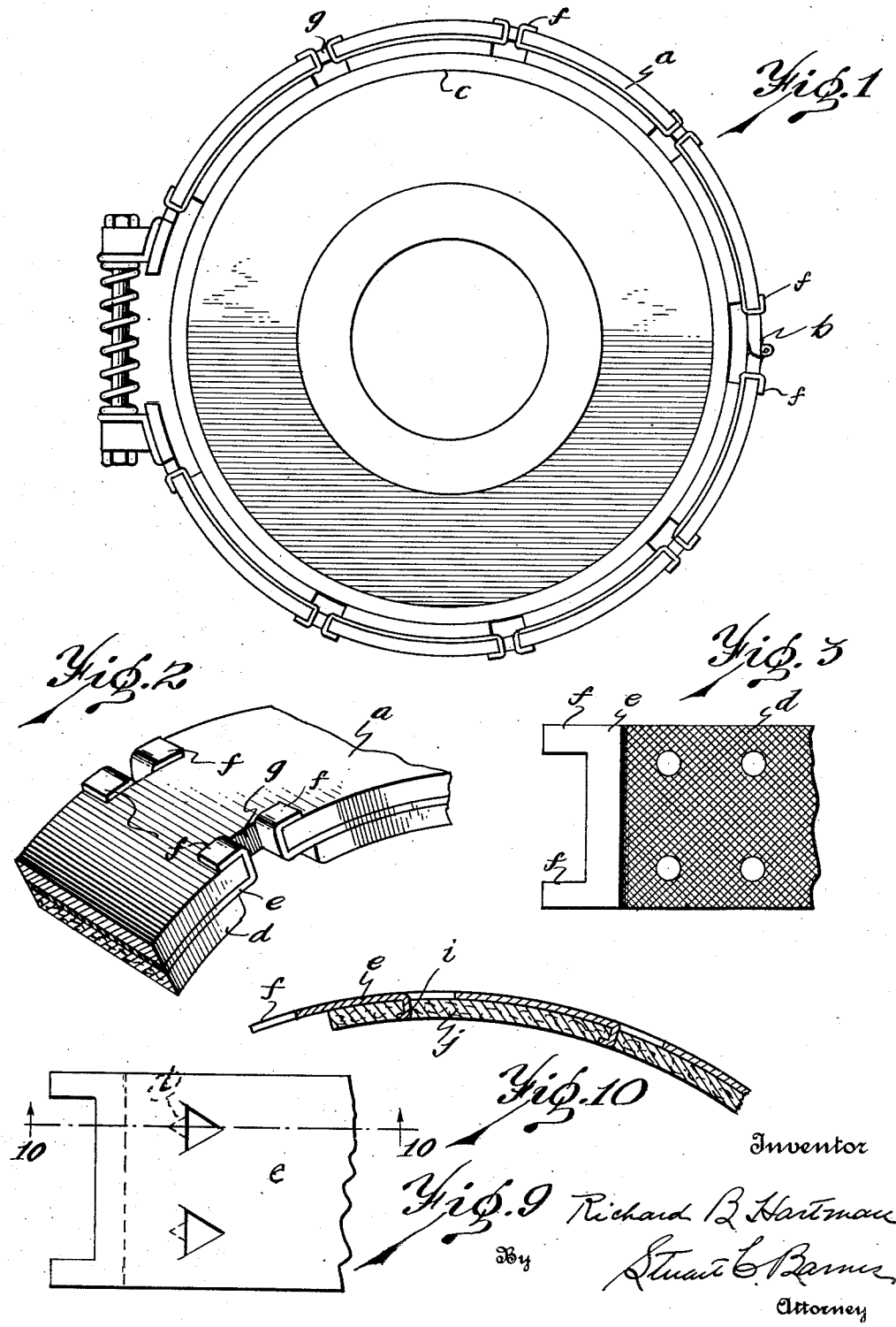

Patented May 12, 1925.

1,537,233

UNITED STATES PATENT OFFICE.

RICHARD B. HARTMAN, OF MIDDLETOWN, OHIO, ASSIGNOR TO HARTMAN BRAKE CORPORATION.

BRAKE BAND AND LINING.

Application filed February 2, 1920, Serial No. 355,846. Renewed October 17, 1924.

*To all whom it may concern:*

Be it known that I, RICHARD B. HARTMAN, a citizen of the United States, residing at Middletown, in the county of Butler and State of Ohio, have invented certain new and useful Improvements in Brake Bands and Linings, of which the following is a specification.

This invention relates to brakes and has for its object a brake band and brake lining, the latter made up of sections which can be removably secured to the brake band by tongues that are bent over suitable portions of the brake band formed to receive them.

In a co-pending application Serial Number 355,285, filed January 30, 1920, I have more generically described and claimed an improvement in brake linings which consists of making the brake lining up in the form of segments that can be removably secured in the brake band so that any segment can be separably removed and replaced by a new segment.

It is the object of the present invention to afford a different and very simple means of removably securing these brake lining segments to the band so that they will be locked both against longitudinal movement and against sidewise movement.

In the drawings,—

Fig. 1 is an inside elevation of a brake drum and brake band.

Fig. 2 is a fragmentary perspective of the band showing how two adjoining ends of brake segments are fastened to the band so as to be removable therefrom.

Fig. 3 is a fragmentary inside elevation of the brake lining segment.

Fig. 4 is a fragmentary side elevation of the band and a pair of segments showing a modified form of the same invention.

Fig. 5 is a fragmentary perspective of the same.

Fig. 6 is a fragmentary inside elevation of the segment of such modified form.

Fig. 7 is a fragmentary plan view of one of the brake lining segments.

Fig. 8 is a section of the same on the line 8—8 of Fig. 7.

Fig. 9 is a plan view of a modified form of segment showing a different way of securing the lining to the segment backing.

Fig. 10 is a longitudinal section of the same modified form.

$a$ designates the brake band, which is here shown made in an upper and lower section hinged together at $b$ so that the upper section can be turned back for facility in relining if this is desired. However, this is wholly unnecessary as the band may be relined by taking the brake lining segments out between the band and the drum and replacing them in the same way. $c$ designates the brake drum. Turning to Fig. 3, it will be seen that the lining material $d$ is carried on a metal backing $e$. The lining material, however, extends short of the ends of the backing $e$ and leaves an exposed portion and is provided with a pair of longitudinally-extending ears $f$. The brake band is notched at $g$ on either side. This permits the ears $f$ to the turned over the side walls of the notch as shown in Fig. 2. This not only holds the brake band from sidewise movement, but the ears having been turned over at either end of the segment, it obviously prevents the brake band from longitudinal movement.

In Figs. 4, 5 and 6, I have shown a modified form of construction in which the ears $h$ extend transversely from the backing $e$ and instead of being turned over the side walls notched at $g$, as shown in Fig. 2, they are turned over on the reduced portion of the band between the two notches $g$ as shown in Fig. 5. Inasmuch as these ears $h$ are located at both ends of the segment and the distance between the ears is substantially the same as the distance between the notches, they hold the brake lining segment not only from sidewise movement but longitudinal movement.

Obviously the brake lining segment may be very easily removed by simply prying up the tongues or ears with a screw-driver or similar implement and slipping the segment out between the drum and the band. A new segment may be easily slipped in place and the ears turned over the band adjacent the notch.

The brake band segment is preferably made of a rigid metallic material for the backing $e$ which may have triangular tongues $i$ struck out upon which the brake lining material $j$ is impaled and the tongue point then turned over, as shown in Fig. 10. This makes a cheap and effective construction for the brake lining segment which may be sold as a separate article by any repair or garage man and may be carried in the tool chest for replacements.

In Figs. 7 and 8, instead of using a tongue, tubular bosses $k$ are struck out of the material of the backing and after the brake lining material has been slipped over these bosses, the edges may be turned over as at $l$ to securely lock the brake lining material to the backing $e$.

What I claim is:

1. In a brake, the combination of a brake band provided with pairs of notches, the notches of a pair being located at opposite sides of the brake band, and brake lining segments which can be removably secured to the brake band, said brake lining segments being provided with tongues adapted to be bent over the band at the notches.

2. A friction band for brakes comprising a member provided with an indentation extending inwardly from a marginal side edge thereof to receive and retain a lining-securing means.

3. A friction band for brakes comprising a member provided with indentations extending inwardly from oposite marginal side edges thereof to receive and retain a lining-securing means.

4. In a brake, the combination of a brake band provided with pairs of notches in the edges, notches of a pair being opposite each other, and a plurality of removable brake lining segments comprising each a metallic backing and a facing of brake lining material, the metallic backing being provided with tongues or ears adapted to be bent over the brake band at the notches to lock said segments from transverse or longitudinal movement and hold the brake lining segments removably in place.

5. In a brake, the combination of a brake band provided with pairs of notches in its side edges, and removable brake lining segments each comprising a metallic backing provided with punched out tongues and a facing of brake lining material secured thereto, the said tongues being adapted to be turned over the side walls of the notches to lock the brake lining segments removably to the brake band.

6. A friction band for brakes comprising a member having marginal edges; a portion of an edge being arranged in a plane different from the plane of another portion of the edge to constitute retaining means for a lining-securing instrumentality.

7. In a brake, a friction band having a marginal edge, a portion of the edge being arranged in a plane different from the plane of another portion of the edge to constitute a retaining means for a lining-securing instrumentality; a lining disposed on the friction band; and means securing the lining to the band, cooperating with the retaining means on the edge of the band.

8. In a brake, a friction band having a marginal edge provided with a recessed portion, an edge of which is out of the plane of an edge of the band, and another edge of the recessed portion constituting a stop; a brake band lining disposed on the band; and means for securing the lining to the band, said means including a member connected with the lining and adapted to have a portion of the member disposed in the recessed portion of the band and bear against a portion thereof to secure the lining against lateral and longitudinal movement on the band.

9. In a brake, a friction band having marginal side edges provided with recessed portions, each recessed portion having an edge in approximate parallelism with the corresponding edge of the friction band but in a plane different from the plane of the edge of the friction band, and another edge, arranged at an angle to these edges to constitute a stop; a lining comprising a plurality of sections arranged around the band; and means for securing each section to the band, said means including members connected with the lining and adapted to have a portion of each member disposed in a notch on each side edge of the band and bearing against a portion of the notch to secure the lining against longitudinal and transverse movement on the band.

10. In combination, a brake band, a lining therefor, and detachable means between the brake band and lining consisting of a plurality of studs extending from the lining and into suitable openings in the brake band and adapted for holding the brake band lining against movement with relation to the brake band.

11. A brake lining comprising a strip of heat resistant friction material, a metallic band to which said material is secured, said band having oppositely projecting lugs adapted to be bent over the notched edges of a brake band, whereby the brake lining is securely held in place.

12. A brake band for vehicles, comprising a notched steel band, and a lining therefor, said lining comprising a friction material having projecting metallic lugs adapted to be bent into the notches in the steel band to secure the lining thereto.

In testimony whereof I affix my signature.

RICHARD B. HARTMAN.